UNITED STATES PATENT OFFICE.

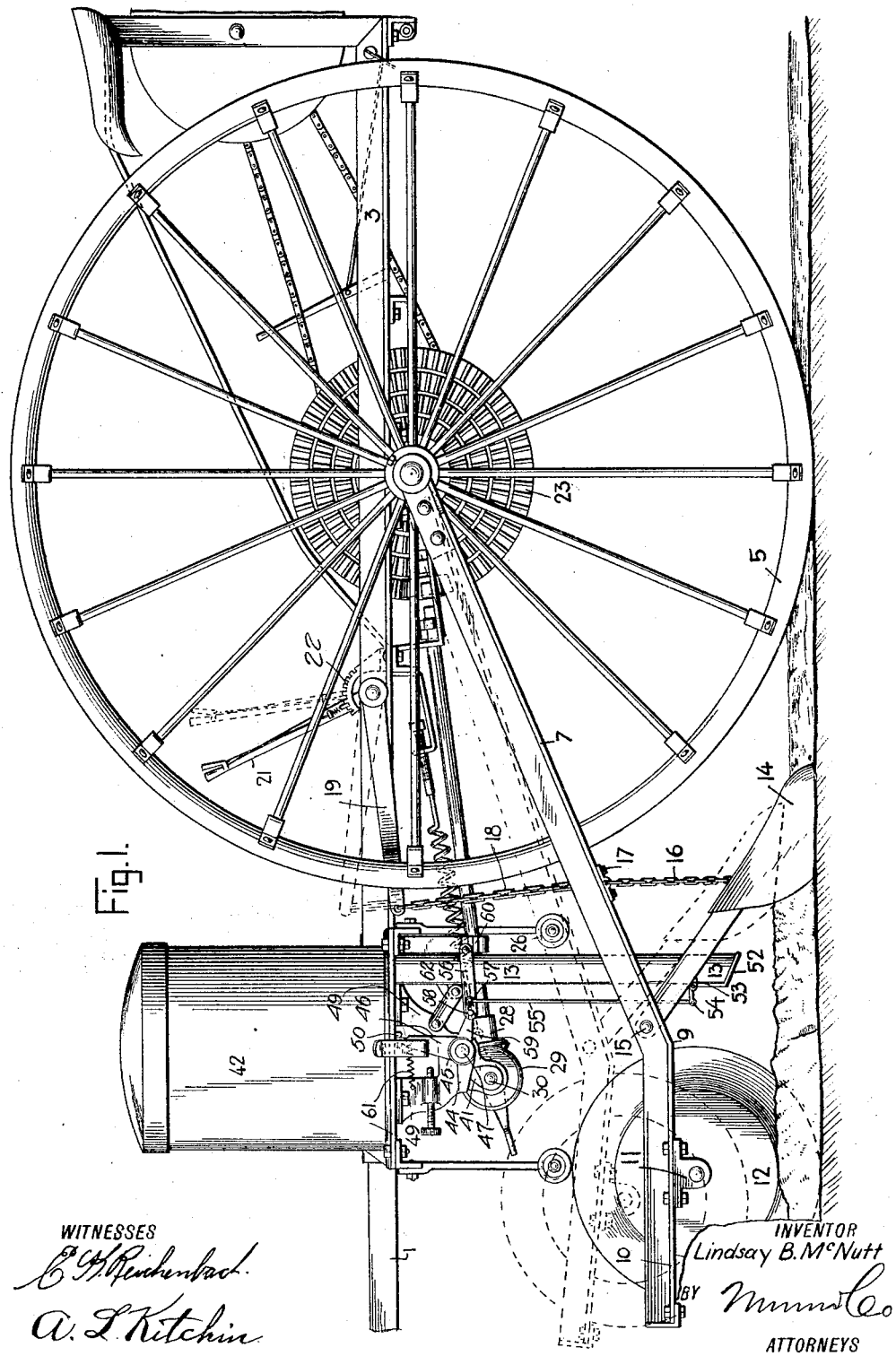

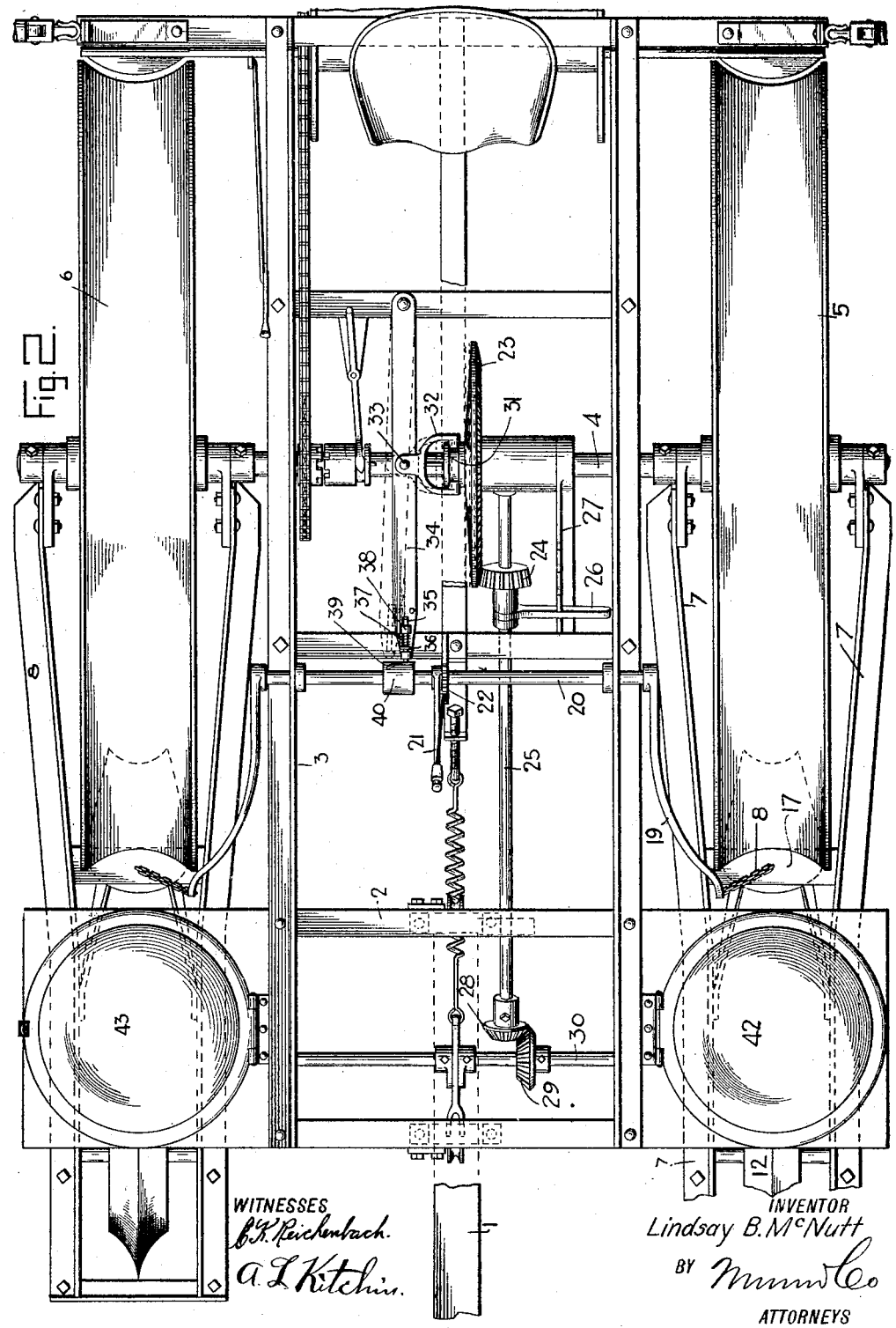

LINDSAY B. McNUTT, OF NORTH KINGSVILLE, OHIO.

PLANTING-MACHINE.

1,111,602.  Specification of Letters Patent.  Patented Sept. 22, 1914.

Application filed February 7, 1913. Serial No. 746,779.

*To all whom it may concern:*

Be it known that I, LINDSAY B. McNUTT, a citizen of the United States, and a resident of North Kingsville, in the county of Ashtabula and State of Ohio, have invented a new and Improved Planting-Machine, of which the following is a full, clear, and exact description.

This invention relates to improvements in planting machines, and particularly to machines for planting seeds of various kinds, as for instance, for planting corn, and has for an object to provide an improved mechanism for correctly dropping any desired quantity of seed at spaced intervals of any desired length.

Another object more specifically, is the provision of a dropping mechanism operated by a suitable cam moved by a rotating shaft intergeared with the traction wheels of the machine so that as the machine moves a predetermined distance forward the cam will be actuated for actuating the dropping mechanism whereby seed is dropped at predetermined spaced intervals, the intergearing mechanism being adjustable so as to actuate the cam at any desired speed in relation to the speed of the traction wheels.

In carrying out the objects of the invention, a framework of substantially any kind is provided and supported at its rear end by a pair of traction wheels spaced a certain distance apart, namely the distance of the rows in which the seed is to be planted. The dropping mechanism is mounted on a frame and in line with the wheels so that as the seeds are dropped the wheels, together with the dragging mechanism will cover the same. In connection with the dropping mechanism, a cam structure is arranged to cause the actuation of the dropping mechanism at certain intervals. This cam mechanism is driven or moved continuously as the planter is moved across the field so that the dropping mechanism will be regularly operated. In order to cause the cam to continuously operate as the machine moves, the same is intergeared with the traction wheels by a differential gearing which may be variously adjusted or set so that the cam may operate at different speeds whereby the seed dropped from the dropping mechanism may be dropped or deposited at different distances. In connection with the intergearing of the cam with the traction wheels of the machine a suitable throw-out or disconnecting mechanism is provided so that the cam will be disconnected from the traction wheels.

A practical embodiment of the invention is represented in the accompanying drawings forming a part of this specification, in which similar characters of reference indicate corresponding parts in all the views.

Figure 1 is a side view of an embodiment of the invention; Fig. 2 is a top plan view of the structure shown in Fig. 1.

Referring to the accompanying drawings by numerals, 1 indicates a tongue of any usual or preferred structure, which is bolted or secured in any desired manner to the cross frame 2. The cross frame 2 is rigidly secured by bolts or rivets, or in any other desired manner, to a longitudinal frame 3. The longitudinal frame 3 is mounted upon an axle 4 supported by traction wheels 5 and 6. In addition to frame 3, swinging frames 7 and 8 are pivotally mounted on the axle 4. The frames 2 and 3 are rigidly secured together and form a sort of platform with which the remaining features of the invention are associated. The various frames may be made from any desired material, but preferably from angle iron, as shown in the drawing, which presents a comparatively light but stiff, strong structure, and one that will withstand the usual more or less rough usage to which the machine is put.

Each of the swinging frames 7 and 8 are identical, so that a description of frame 7 will equally apply to frame 8, and associated parts. As clearly shown in Figs. 1 and 2, frame 7 is bent at point 9 so that when the frame is in operative position as shown in Fig. 1, the lower end 10 is substantially horizontal. This lower end is provided with journals 11 in which the axle of a furrow opener 12 is fitted. The furrow opener 12 may be of any desired shape, that shown being substantially in the form of a wheel having a V-shaped periphery. This furrow opener is designed to open the ground so that the seed may drop from the chute 13 into the opening before the covering scraper 14 closes the opening. The covering scraper 14 is pivotally mounted at 15 to frame 7, and in operation rests against the ground for scraping the earth over and filling the opening caused by the furrow opener 12. The covering scraper 14 has connected therewith a chain 16, which in turn is connected with a plate 17 whereby the covering scraper, or plow as it is sometimes called, is supported by frame 7, but allowed a certain amount of independent movement. Connected with plate 17 is a lifting chain 18, which in turn is connected with arm 19. Arm 19 is rigidly secured to shaft 20, which in turn is pivotally mounted on frame 3 and operated by a suitable lever 21 associated with a locking segment 22 in the usual manner, whereby when lever 21 is moved to the dotted position shown in Fig. 1, frame 7 will be raised to the dotted position shown in Fig. 1 so that the furrow opener 12 and member 14 will be raised or lifted out of contact with the earth.

When mounting the wheels 5 and 6 on the axle 4, the same are rigidly secured thereto by any desired means so that axle 4 will turn with the wheels. The frame 3 is supported by any suitable bearing member (not shown) so that the axle 4 may freely rotate or drive the crown gear wheel 23. The crown gear wheel 23 is formed of the usual construction, with a plurality of banks of spaced gear teeth designed to mesh at different times with the teeth of pinion 24. Pinion 24 is splined to shaft 25 whereby the same may be moved longitudinally thereof in order to engage any of the banks of teeth on the wheel 23, a suitable arm 26 being provided for shifting the position of the pinion 24. A rack 27 is provided with as many notches as there are banks of teeth in the wheel 23 so as to lock pinion 24 in mesh with any of the banks of teeth. Shaft 25 when rotated moves the beveled pinion 28 which continually meshes with pinion 29. Pinion 29 is rigidly secured to shaft 30 which is connected with the cam and associated mechanism for operating the dropping mechanism hereinafter fully described. From this it will be seen that when pinion 24 and gear wheel 23 are in mesh and the machine is being moved, motion will be transmitted to shaft 30 and from thence to the dropping mechanism. If it is desired at any time to move the machine without causing a rotation of shaft 25 through gears 23 and 24, gear 23 may be moved longitudinally of axle 4 away from pinion 24 so as to be out of mesh therewith, wheel 23 being splined to shaft 25, as clearly shown in Fig. 2. In order to properly manipulate the wheel 23 and to hold the same in either of its positions, the same is provided with a grooved hub extension 31, in which the ends of a yoke 32 project. The yoke 32 is pivotally mounted at 33 to a pivotally mounted lever 34. The lever 34 has connected therewith a reciprocating pin 35 provided with an extension 36 against which spring 37 presses. The spring 37 also presses against stop 38, whereby the pin 35 is given a normal tendency to move away from stop 38 and into the cam slot 39 formed on member 40. Member 40 is rigidly secured to shaft 20 so that when lever 21 is moved to the dotted position shown in Fig. 1 for raising frames 7 and 8, the walls of the slot 39 act on pin 35 and move the same so that lever 34 will be swung to the dotted position shown in Fig. 2, and wheel 33 moved out of mesh with pinion 24. After this has been done the machine may be moved freely without causing the actuation of the dropping mechanism, or in fact any of the mechanism.

As heretofore described when shaft 25 rotates, the same will cause shaft 30 to rotate through gears 28 and 29. When shaft 30 is being rotated, the same operates a cam 41 which is rigidly secured thereto. It will be understood that a cam and associated parts is associated with each of the hoppers 42 and 43 shown in Fig. 2, but that a description of one will equally apply to both. Upon each rotation of cam 41 the same will engage the extension 44 of the bell crank lever 45 and move the same a certain distance, whereby the extension 46 is moved a corresponding distance. The bell crank lever 45 is rigidly connected by any desired means to a rocking shaft 47. The rocking shaft 47 is rotatably mounted in the bracket 49 in any desired manner so as to freely move when cam 41 presses against extension 44. When extension 46 is moved the same will move a suitable dropping slide 50, associated with hopper 42. When the dropping slide is moved the same will move a certain quantity of seed to a position above the chute 13 whereby the same is dropped downwardly to the lower end of the chute. A lid or cover 52 is provided at the lower end of the chute 13, as shown in Fig. 1, so that the seed cannot move out of the chute until slide 50 associated with hopper 42 has moved back to its original position and the upper end of chute 13 closes. This allows a full quantity of seed to be dropped at a time. Lid 52 is pivotally mounted at 53 and is provided with an extension 54 which has pivotally connected therewith a link 55. The link 55 in turn is pivotally connected with a horizontal link 56. Link 56 is provided with a slot 57 through which a pin 58 passes. Pin 58 is connected with an extension 59 forming part of the bell crank lever 45 so that when cam 41 moves from beneath extension 44, the extension 59 may be moved pivotally so as to raise one end of the link 46 and consequently raise link 55, whereby the lid 52 is moved from beneath chute 13. Link 56 is pivotally connected with a bracket 60 secured by bolts, or in any other desired manner, to the cross frame 2. In order to steady chute 13, the same is connected with the bracket 49 by a suitable connecting link 62. When the bell crank lever 45 is moved, the same brings under tension spring 61 so that when cam 41 has become disengaged from the extension 44 the bell crank lever 45 will be moved back to its original position, and also slide 50 will be moved back.

Having thus described my invention I claim as new and desire to secure by Letters Patent:—

1. In a seed dropping or planting machine, a pair of traction wheels, an axle rigidly secured to said traction wheels, a frame mounted on said axle, a dropping mechanism arranged on said frame and in front of each of said traction wheels, means for connecting said axle with said dropping mechanism for causing the actuation of the dropping mechanism when the axle is rotated, said means including a sliding gear member arranged on the axle, and a pinion meshing with the gear member, a swinging frame straddling each of said traction wheels, a furrow opener mounted on each of said swinging frames, a lifting mechanism mounted on said first mentioned frame connected with said swinging frames for lifting the swinging frames so that the furrow openers carried thereby will be out of contact with the earth, a cam member connected with said lifting mechanism and actuated thereby when the swinging frames are elevated, and means connected with the gear wheel splined to said axle actuated by said cam for disconnecting said gear wheel from said pinion when said swinging frames have been elevated whereby the machine may be moved from one place to the other without opening a furrow and without actuating the seed dropping mechanism.

2. In a seed-dropping or planting machine, a pair of traction wheels, an axle rigidly secured to said traction wheels, a dropping mechanism, means for connecting said axle with said dropping mechanism for causing the actuation of the dropping mechanism when the axle is rotated, said means including a sliding gear member arranged on the axle, and a pinion meshing with the gear member, a swinging frame adjacent each of the traction wheels, a furrow opener mounted on each of said frames, a lifting mechanism connected with said frames, for lifting the same so that the furrow openers carried thereby will be out of contact with the earth, a cam member connected with said lifting mechanism and actuated thereby when the swinging frames are elevated, and means connected with the gear wheel splined to said axle actuated by said cam, for disconnecting said gear wheel from said pinion when said swinging frames have been elevated, whereby the machine may be moved from one place to the other without opening a furrow, and without actuating the said dropping mechanism.

3. In a seed-dropping or planting machine, a seed-dropping mechanism, traction wheels, an axle connected with said traction wheels and rotated thereby, means for connecting said axle with the seed-dropping mechanism, whereby the seed-dropping mechanism will be operated when the traction wheels are rotated, said means including a pinion, and a gear wheel splined to said axle, said pinion and said gear wheel being normally in mesh, and means for disconnecting the seed-dropping mechanism from said axle, said means including a pivotally mounted arm, means for connecting said arm with said gear wheel, a pin extending from said arm, a cam engaging said pin, and a hand-operated mechanism for moving said cam, whereby when said hand-operated mechanism is moved said gear wheel will be moved longitudinally of said axle.

In testimony whereof I have signed my name to this specification in the presence of subscribing witnesses.

LINDSAY B. McNUTT.

Witnesses:
JOHN J. FARRELL,
FRANK H. KENYON,
C. W. McCLANNING.